United States Patent
Lopez

(10) Patent No.: US 10,484,278 B2
(45) Date of Patent: Nov. 19, 2019

(54) APPLICATION-BASED NETWORK PACKET FORWARDING

(71) Applicant: Fortinet, Inc., Sunnyvale, CA (US)

(72) Inventor: Edward Lopez, Herndon, VA (US)

(73) Assignee: Fortinet, Inc., Sunnyvale, CA (US)

( * ) Notice: Subject to any disclaimer, the term of this patent is extended or adjusted under 35 U.S.C. 154(b) by 19 days.

(21) Appl. No.: 15/810,103

(22) Filed: Nov. 12, 2017

(65) Prior Publication Data

US 2018/0227229 A1    Aug. 9, 2018

Related U.S. Application Data

(63) Continuation-in-part of application No. 14/661,130, filed on Mar. 18, 2015, now abandoned.

(51) Int. Cl.

| | |
|---|---|
| *H04L 12/741* | (2013.01) |
| *H04L 12/801* | (2013.01) |
| *H04L 29/12* | (2006.01) |
| *H04L 12/851* | (2013.01) |
| *H04L 29/06* | (2006.01) |
| *H04L 12/813* | (2013.01) |
| *H04L 12/26* | (2006.01) |
| *H04L 12/725* | (2013.01) |
| *H04L 12/703* | (2013.01) |

(52) U.S. Cl.
CPC ............ *H04L 45/74* (2013.01); *H04L 43/028* (2013.01); *H04L 45/28* (2013.01); *H04L 45/306* (2013.01); *H04L 47/20* (2013.01); *H04L 61/1511* (2013.01); *H04L 69/22* (2013.01)

(58) Field of Classification Search
CPC ....... H04L 45/74; H04L 45/28; H04L 45/306; H04L 69/22; H04L 43/028; H04L 61/1511; H04L 47/20
See application file for complete search history.

(56) References Cited

U.S. PATENT DOCUMENTS

| | | | | |
|---|---|---|---|---|
| 2002/0065938 | A1* | 5/2002 | Jungck | .................... H04L 47/10 709/246 |
| 2006/0187942 | A1* | 8/2006 | Mizutani | ............. H04L 47/2408 370/401 |
| 2007/0104197 | A1* | 5/2007 | King | .................... H04L 63/0263 370/392 |
| 2010/0250918 | A1* | 9/2010 | Tremblay | ............ H04L 47/2441 713/150 |
| 2015/0120909 | A1* | 4/2015 | Karthikeyan | ....... H04L 61/1511 709/224 |

\* cited by examiner

*Primary Examiner* — Kiet Tang
(74) *Attorney, Agent, or Firm* — Jaffery Watson Mendonsa & Hamilton, LLP

(57) ABSTRACT

Methods and systems for detecting an application associated with a given IP flow and differentially forwarding packets based on determined application are provided. According to one embodiment, an initial Internet Protocol (IP) packet of an IP flow is received by a network device. An application with which the initial IP packet is associated is determined by the network device. Based on the determined application, a forwarding rule to be applied to the initial IP packet is identified by the network device. Thereafter, the initial IP packet and subsequent IP packets associated with the IP flow are forwarded by the network device based on the identified forwarding rule.

24 Claims, 7 Drawing Sheets

APPLICATION-BASED NETWORK PACKET FORWARDING

CROSS-REFERENCE TO RELATED PATENTS

This application is a continuation-in-part of U.S. patent application Ser. No. 14/661,130, filed on Mar. 18, 2015, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2015-2017, Fortinet, Inc.

BACKGROUND

Field

Embodiments of the present invention generally relate to packet forwarding/processing in computer networks. In particular, various embodiments of the present invention relate to systems and methods for determining an application with which a packet is associated and differentially forwarding the packet based on the determined application.

Description of the Related Art

Proliferation of applications and availability of dedicated applications from various service providers coupled with the development of economical and easily available small and smart computing devices has resulted in an exponential increase in network traffic. Because of this, at many instances there can be interruption or delay in flow of critical or strategically important traffic at the cost of non-essential or non-critical traffic. For example, downloading of media content could occupy most of the bandwidth whereby no bandwidth is left for video conferencing with a client or available network bandwidth is reduced by spam traffic and/or traffic associated with malware. To resolve these conflicts, networks routinely screen network traffic through firewalls and also enforce policies and rules to monitor and filter traffic flow. Though helpful, these systems can still be overwhelmed and bandwidth for critical traffic may still not be available.

Further, because of increase in traffic, the quality of many essential services suffers. Though individuals generally complain the most when a call drops, a video takes too much time to open or a website does not open instantly, it is generally the office/business/enterprises that is most affected by the degradation in traffic flow. Important information may be delayed or dropped because of traffic congestion or a link may fail during a video conference and such types of delay/interruption may not be acceptable. Many ways are being explored and adopted by service providers to improve the quality of service. Some of these methods include increase in bandwidth, use of dedicated lease lines, establishing of local area networks (LANs)/Virtual Private Networks (VPNs). Though initially successful, these systems were soon overwhelmed by the increasing traffic. Traffic generated by spammers, for example, compound this problem. Further, the traffic load further continues to increase as industry innovators develop new and diverse applications for providing a variety of services to sub scribers.

Usually screening and filtering of traffic is performed by firewall devices, which are typically dedicated devices configured to permit or deny traffic flow based on the organization's security policies. High-end firewalls also have the ability to dynamically load balance the traffic, and can also determine whether to deny or permit the data flow based on the information included within each packet that may define a state of flow associated with the packet. The firewall generally performs the flow based forwarding by caching or otherwise storing flow state of given communication session between two devices.

Various methods can be adopted for screening the traffic. In some cases, use can be made of a store and forward method, wherein the data packets are stored and analyzed and then forwarded based on analyzed data. Another approach is a cut through method, wherein the full data packet is not analyzed but forwarded based on a frame's hardware address. In case of any conflict, the system reverts to the store and forward method. Another method that attempts to retain the benefits of both store and forward and cut through is the fragment free method, wherein the system checks the first 64 bytes of the frame that store the addressing information. According to Ethernet specifications, collisions should be detected during the first 64 bytes of the frame so as to prevent frames that are in error because of a collision from being forwarded. This way the frame will always reach its intended destination. Error checking of the actual data in the packet is left for the end point. An adaptive method can also be employed, wherein the system can be configured to decide autonomously between the other three methods. However, analysis of the complete data frame can introduce delays in the network, which may not be desirable or acceptable for many critical applications.

Another method to improve the quality of service can be to ensure efficient sharing and effective sharing of all the deployed computer resources. This can be achieved by scheduling workload amongst distributed resources in an intelligent manner and developing new and more efficient techniques for analysis and routing/distributing of network traffic while also ensuring that such methods and process do not unnecessarily increase the latency of the device/network.

Those skilled in the art of network communications appreciate there is a distinction between "forwarding" and "routing." Forwarding refers to the effective transfer of a packet, frame or the like downward or toward the intended destination of the packet or data frame at issue. Forwarding typically makes use of a forwarding table to determine the next hop to which the packet or frame at issue should be forwarded based on layer 2 (L2) addressing information (e.g., a source and/or a destination Media Access Control (MAC) address) contained within the packet or frame at issue. Meanwhile, routing refers to the use of a routing algorithm to decide which route or path (i.e., a set of hops) through a network a packet will take between layer 3 (L3) addresses (e.g., a source Internet Protocol (IP) address and a destination IP address). Typically, a routing table or routing information base (RIB) is maintained by layer 3 (L3) devices that contains a list of routes to particular network destinations. The routing table contains information regarding the topology of the network immediately surrounding the L3 device and may be updated as the topology changes.

In existing systems, packet forwarding takes place solely based on Layer 2/3 source/destination MAC/IP addresses, which does not allow differential forwarding of packets based on the application with which the packet is associated.

While application control solutions purport to deliver predictable application performance under heavy network load by prioritizing critical applications, restricting usage of bandwidth-heavy applications and blocking of restricted applications from the network, a key problem with application control is the fact that layer 7 (L7) application detection occurs after a session has been established. Since the session has already been established, options available with respect to the session are limited to allowing/blocking/rate-limiting the session; however, differential forwarding is not an option at this point as one or more initial packets associated with the session have already been forwarded and subsequent packets of the session will typically be treated/forwarded in a similar manner.

It would be desirable to have the ability to more quickly detect the layer 4 or layer 7 (L4/L7) application with which an IP flow is associated so as to allow application-based forwarding.

SUMMARY

Methods and systems are described for detecting an application associated with a given IP flow and differentially forwarding packets based on determined application. According to one embodiment, an initial Internet Protocol (IP) packet of an IP flow is received by a network device. An application with which the initial IP packet is associated is determined by the network device. Based on the determined application, a forwarding rule to be applied to the initial IP packet is identified by the network device. Thereafter, the initial IP packet and subsequent IP packets associated with the IP flow are forwarded by the network device based on the identified forwarding rule.

Other features of embodiments of the present invention will be apparent from the accompanying drawings and from the detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1A:
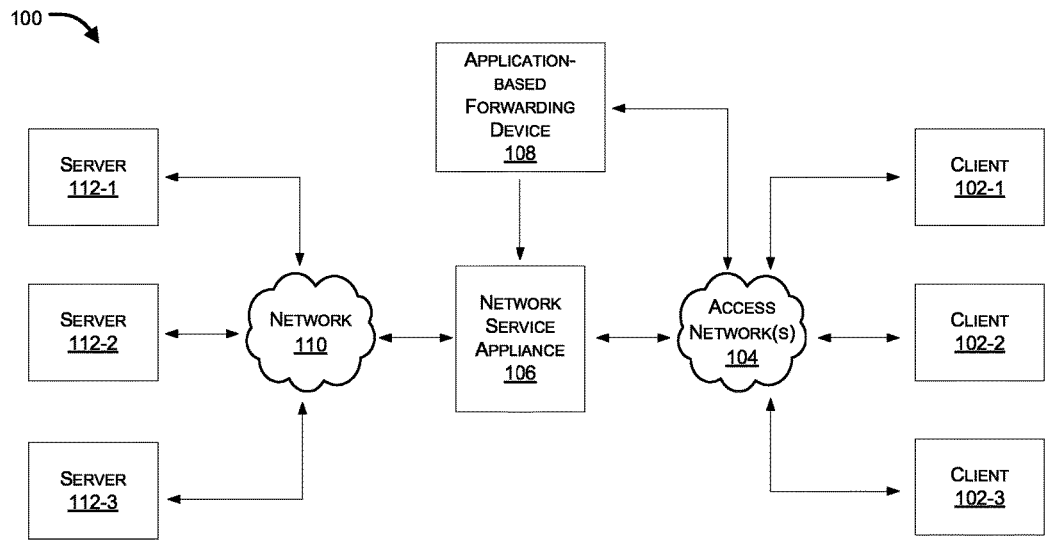
FIG. 1A illustrates an example network architecture having an application based forwarding device configured to differentially forward the data packets in accordance with an embodiment of the present invention.

Methods and systems are described for detecting an application associated with a given IP flow and differentially forwarding packets based thereon. Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

Methods and systems are described for detecting an L4/L7 application associated with a given IP flow and differentially forwarding packets based on determined application. Aspects of the present disclosure relates to methods and systems for determining/predicting an application associated a given IP flow with initial packets (header packet or data packets) and differentially forwarding the initial packet and subsequent packets of the IP flow based on the determined/predicted application associated with the initial IP packet.

An aspect of the present disclosure provides a network device that can include a receiver module that is configured to receive an initial packet from an IP packet flow, a classifier module configured to determine an application with which the initial IP packet is associated, a resolver module configured to identify a packet forwarding rule(s) to be applied on the initial IP packet based on the determined application, and a forwarder module configured to differentially forward the initial IP packet and subsequent IP packets associated with the IP flow based on the identified forwarding rule. According to an aspect of the present disclosure, the network device can include, but is not limited to, a router, a gateway device, a switch, a hub, a programmable layer 2 switch, among other like devices.

In an example implementation, receiver module can also be configured to pre-process packets, through means such as encapsulation, encryption, and network address translation, the initial IP packet(s) before the classifier module performs the application determination processing. According to an embodiment of the present disclosure, the classifier module can be configured to determine the application based on IP header information of the initial IP packet. According to another embodiment of the present disclosure, classifier module can be configured to determine the application based on ingress interface identifier associate with the initial IP packet of an IP flow. According to yet another embodiment of the present disclosure, classifier module can be configured to determine the application by performing deep packet inspection (DPI) on the initial IP packet. According to another embodiment, a combination of above-mentioned techniques can be incorporated in order to identify the application to which the initial packet pertains.

In an example implementation, the classifier module can be configured to determine the application or predict the application based on a fully qualified domain name (FQDN) value contained within the Domain Name System (DNS) request issued prior to initiation of a secure communication session. In example implementation, FQDN value can be mapped to information identifying the application by means of a database that is operatively coupled with the classifier module.

According to an embodiment, the resolver module can be operatively coupled with a policy-based rule engine that enables mapping of the determined application with a forwarding rule (e.g., an L2 forwarding policy). L2 forwarding policies configure how packets that match certain L2 criteria are to be forwarded. For example, the matching L2 forwarding policy may specify an action for matching frames, e.g., permitting or denying network traffic to and/or from certain MAC addresses and/or specifying a forwarding action (e.g., forward directly, forward indirectly, forward with encapsulation to the next non-adjacent hop). In an example implementation, the resolve module can be configured to identify the forwarding rule based on the determined application, wherein the forwarding rule can then be used by the forwarder module to differentially forward the initial IP packet and the subsequent IP packets associated with the IP flow to the destination application or destination device hosting the application, or to a next hop/network element in the network.

According to an embodiment, the forwarder module can be configured to forward the initial IP packet and subsequent IP packets of IP flow using an egress interface associated with the identified forwarding rule. In an example implementation, the forwarder module can be configured to forward the initial IP packet and subsequent IP packets of IP flow to the appropriate application or device hosting said application based on encapsulation information of the initial IP packet.

According to an embodiment of the present disclosure, the forwarder module can be configured to forward the initial IP packet by means of a level-2 shunt that forwards the initial IP packet to a level-2 reflector device.

An aspect of the present disclosure relates to a method for determining an application with which a packet may be associated by analysis of the initial packet of IP flow and differentially forwarding the initial packet and subsequent packets to the determined application and/or application hosting device. According to one embodiment, method of the present disclosure can include the steps of receiving an initial IP packet from an IP flow, determining an application with which the initial IP packet is associated, identifying a forwarding rule to be applied to the initial IP packet based on the determined application, and forwarding the initial IP packet and subsequent IP packets associated with the IP flow based on the identified forwarding rule.

FIG. 1A illustrates an exemplary network architecture 100 having an application based forwarding device 108 that is configured to differentially forward data packets in accordance with an embodiment of the present disclosure. When a client device, such as client 102-1, client 102-2, and client 102-3, which may be collectively and interchangeably referred to as client device(s) 102 hereinafter, sends a request to a server device, such as server 112-1, server 112-2 or server 112-3, which may be collectively and interchangeably referred to as server 112 hereinafter, the request can be sent through one network, for instance access network 104, to another network, for instance network 110, through a network service appliance 106. Architecture 100 can further include a switch (not shown) interconnecting networks such as 104 and 112. In particular embodiments, one or both of networks 104 and 112 are an intranet, an extranet, a virtual private network (VPN), a local area network (LAN), a wireless LAN (WLAN), a wide area network (WAN), a metropolitan area network (MAN), a portion of the Internet, or another network or a combination of two or more such networks. Networks 104 and 112 may differ from each other in one or more respects. Networks 104 and 112 may be similar to each other in one or more respects. Although the present disclosure describes and illustrates two networks 104 and 112, the present disclosure contemplates any suitable number of networks. A data center may include one or both of networks 104 and 112. One or both of networks 104 and 112 may each or together be part of or make up a data center. The present disclosure contemplates any suitable networks 104 and 112. One or more links may couple each of networks 104 and 112 together via one or more switches, gateways, routers and the like. In particular embodiments, one or more of such links may be in the form of wireline, wireless, or optical links. In particular embodiments, one or more such links include an intranet, an extranet, a VPN, a LAN, a WLAN, a WAN, a MAN, a portion of the Internet, or another link or a combination of two or more such links. In particular embodiments, a link may include one or more links. The present disclosure contemplates any suitable links coupling networks 104 and 112.

As an example and not by way of limitation, a switch may include a switching platform that includes one or more integrated-service blades or is coupled to one or more external appliances to deliver one or more services, such as, for example, firewalling or other security services, Network Address Translation (NAT), application visibility and monitoring (AVM), statistics gathering, load balancing, proxying, VPN termination, or traffic shaping. Herein, reference to a service or network service may encompass a function or combination of functions that directly operates on a packet or stream of packets, or operates on information determined from a packet or stream of packets, where appropriate. Although the present disclosure describes and illustrates particular services, the present disclosure contemplates any suitable services. A service may include one or more rich services, where appropriate.

Depending upon the particular implementation, the network service appliance 106 may be a switch, a hub, a router, a gateway device or a combination thereof that can be configured to a receive a data packet of an IP traffic flow, read its header, determine a destination address indicated in the header, and apply one or more routing/forwarding rules in order to forward the packet to the destination server 112. Such a network service appliance 106 can typically be configured to read the source and destination IP addresses and/or media access control (MAC) address from a header of a packet and differentially forward the packets to the determined destination IP address. A typical Layer 2 switch uses the media access control address (MAC address) from the host's network interface card (NIC) to decide where to forward the packets.

A network service appliance 106 may not be aware of the application with which a particular IP packet may be associated and therefore, in order to incorporate application based differential forwarding of data packets, an application-based forwarding device 108 can be operatively coupled with network service appliance 106. Depending upon the particular implementation, application-based forwarding device 108 may be a physical device separate from network service appliance 106 or it may be a logical device implemented as part of network service appliance 106. Application-based forwarding device 108 can also be located remotely from network service appliance 106. In general, application-based forwarding device 108 is operable to receive an initial IP packet of an IP flow and determine the application with which the IP packet is associated. In one embodiment, based on the identified application, a database lookup or table lookup may be performed to identify a corresponding forwarding rule for the application at issue, wherein the forwarding rule can then be used, either by application-based forwarding device 108 and/or network service appliance 106, to route the packet accordingly.

According to one embodiment, application-based forwarding device 108 can be implemented as any forwarding engine, say as part of a switch that connects two or more networks such as 104 and 112, wherein such a forwarding engine 108 (or packet-forwarding engine) can be configured to receive packets, make packet-forwarding decisions, and transmit the packets according to the forwarding decisions. Application-based forwarding engine 108 may also identify or classify one or more packet flows (or traffic or data flows) and monitor and/or meter those packet flows. As an example and not by way of limitation, for each packet flow received by forwarding engine 108, forwarding engine 108 may inspect one or more transport headers of the packets in the packet flow, generate or update one or more metrics for the packet flow, access one or more instructions corresponding to the packet flow, and make routing decisions based on the inspections, metrics and/or instructions.

According to one embodiment, application-based forwarding device 108 can be implemented as part of or independently as a router, a gateway device, a switch such as a programmable layer 2 switch and/or a hub. According to one embodiment, application-based forwarding device 108 can identify an application associated with a packet based on, for instance, the IP header information of the packet, wherein the content of the IP header can be extracted and parsed to determine the application with which the packet is associated. Application-based forwarding device 108 can also be configured to conditionally route or re-route (or direct, redirect, or divert) particular packet flows or one or more packets in a particular packet flow to one or more applications. An application may include a hardware or software element or a combination of two or more such elements for providing one or more services, as described above. An application may run on one or more service engines (or service nodes) which may be internal or external to, say a network device. In particular embodiments, one or more integrated service blades (or blade servers or server blades) or external network appliances may embody or implement one or more applications. By way of example, a service node may be directly connected on one of the ports of switch, while a service node such as an external appliance may be logically connected via a Shared Internet Access (SIA) standard feature set though one or more switches.

In particular embodiments, to provide a service to a packet flow, application-based forwarding device need not perform a full analysis on all packets in the packet flow. For example, application-based forwarding device 108 or network service appliance 106 may establish a flow cache that stores the determined application for active IP flows that have already been evaluated. Hence, processing of a packet of a known flow may be accelerated with reference to the flow cache. Alternatively or additionally, a service blade may be allowed to add shortcuts to the forwarding plane of forwarding engine, which may be responsible for the actual process of sending a packet received on a logical interface to an outbound logical interface—so that forwarding engine does not divert to application-based forwarding device 108 previously identified packet flows.

According to another embodiment, the application associated with a particular packet may be identified based on the ingress interface identifier information (such as ingress interface ID) associated with the packet, and/or based on performing deep packet inspection (using heuristics or signature matching) on the initial IP packet, and/or based on a full qualified domain name (FQDN) value that is part of a DNS request, for example, (that is received by the device 108 before receiving the IP packet at issue). In one embodiment, DNS requests received by application-based forwarding device 108 prior to session establishment can indicate the FQDN value (indicating destination application servers), which can be mapped to information identifying the application and such mapping information can be stored in a database/repository (not shown) to which application-based forwarding device 108 is operatively coupled. Therefore, a database mapping of applications to associated FQDN server values can be used to determine the application prior to session establishment, thus allowing flexibility in traffic forwarding process.

According to one embodiment, once an application associated with an IP packet is identified, a corresponding forwarding rule can be retrieved from a database/repository (not shown), based on which the packet can be transmitted by application-based forwarding device 108 or based on which network service appliance 106 may be directed to forward the packet. In one embodiment, the forwarding rule may identify an egress interface of a network device through which the IP packet is to be transmitted to the intended destination. Transmission of subsequent packets of the IP flow via the same tunnel/egress interface can help maintain session integrity. According to one embodiment, a policy-based engine implemented within application based forwarding device 108 may store the mapping information between applications and corresponding forwarding rules (e.g., L2 forwarding policies). In another aspect, based on the forwarding rule, a forwarding action can be performed using the egress interface associated with the identified forwarding rule. In an embodiment, the forwarding rule can also indicate, for instance, if IP packets of the flow need to be encapsulated/processed prior to being forwarded by means of Internet Protocol Secure (IPSec), Generic Routing Encapsulation (GRE), Virtual Extensible LAN (VxLAN), Locator/Identifier Separation Protocol (LISP), Virtual LAN (VLAN), Transport Layer Security (TLS), Multiprotocol Label Switching (MPLS), General Packet Radio Service (GPRS) Tunneling Protocol User Plane (GTP-U) and the like. In another embodiment, the forwarding rules can also indicate whether the IP packets are to be sent as an L2 shunt to an L2 reflector device.

Figure 1B:
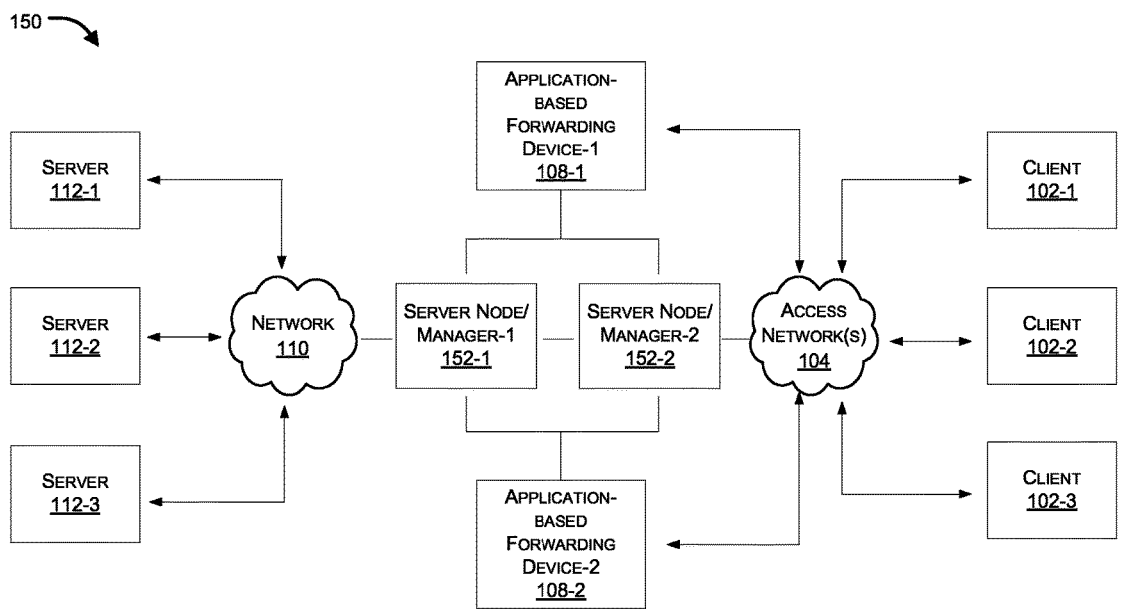
FIG. 1B illustrates an example network architecture having plurality of application based forwarding device configured to perform application based differential forwarding in accordance with an embodiment of the present invention.

FIG. 1B illustrates another exemplary network architecture 150 having multiple application based forwarding devices 108-1 and 108-2 configured to perform application-based differential forwarding of IP packets in accordance with an embodiment of the present invention. In an exemplary implementation, architecture 150 can include multiple server nodes and/or managers 152-1 and 152-2, which may also collectively referred to as sever nodes and/or managers 152 hereinafter, that can be placed between an access network 104 on the client side and a network 110 on the server side to enable clients 102 to transmit requests to servers 112 and receive responses therefrom. As can be seen, in view of the difference with FIG. 1A, instead of network service appliance 106, multiple server nodes and/or managers 152 can be operatively coupled with one or more application-based forwarding devices 108 to enable the devices to receive IP packets, identify an application associated with the packets, retrieve L2 forwarding rule(s) for the identified applications, and transmit the packets using the retrieved forwarding rules using the specified egress interface(s), for example. Those skilled in the art will appreciate that the represented architectures 100 and 150 are exemplary in nature and thus additional or fewer network device(s), component(s), element(s) may be employed as desired.

Figure 2:
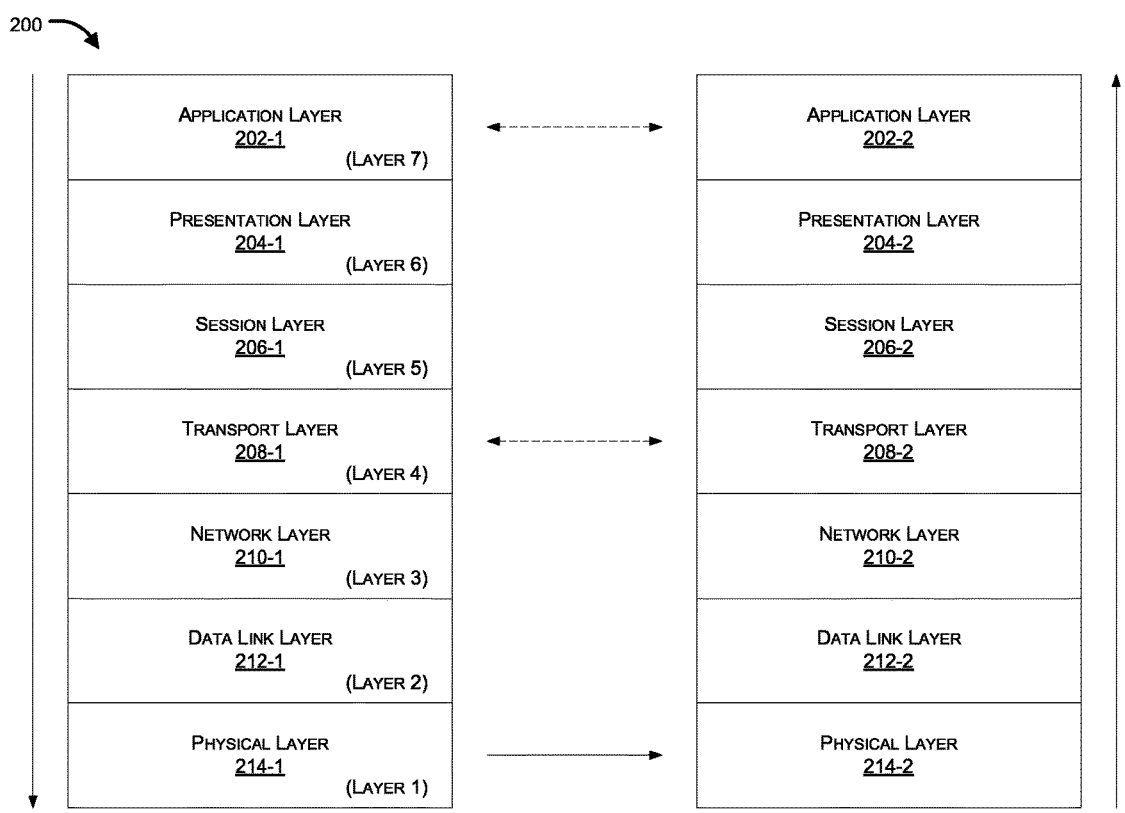
FIG. 2 illustrates the Open System Interconnect (OSI) model of a layered protocol stack and shows how control is passed from one layer to the next.

FIG. 2 illustrates the Open System Interconnect (OSI) model of a layered protocol stack and shows how control is passed from one layer to the next. As shown in FIG. 2, data originating from application layer 202-1 at a packet's origin traverses various layers, including a presentation layer 204-2, a session layer 206-1, a transport layer 208-1, a network layer 210-1, and a data link layer 212-1 before being transmitted over the network through a physical layer 214-1. Similarly at the destination, data in form of packets are received from network at a physical layer 214-2 and propagate upward through various layers, including a data link layer 212-2, a network layer 210-2, a transport layer 208-2, a session layer 206-2 and a presentation layer 204-2 before the data is made available to an application layer 202-2. Different layers of the OSI model are used for inserting/extracting relevant details at different levels to form a communication packet that travels from the source device through intermediate network elements to the destination device. Typical network elements, such as routers, switches and gateway device may be implemented at network layer 210-1 (also referred as layer-3) and at transport layer 212-1 (also referred as layer-4) to provide functional and procedural means for transferring variable length data sequences, also referred to as datagrams hereinafter, from a source node to a destination node. A layer 3 device reads a packet and routes it to the next node in the network based on the IP address of the destination device and one or more routing algorithms. Layer-3 devices are not aware of application data contained within the application layer 202-1/202-2 and hence are unable to differentiate between different applications with which a packet may be associated. Methods and systems of the present disclosure allow a layer 2 or layer 3 device to differentially forward IP packets based on respective applications with which the packets are associated by ascertaining such applications. In another example implementation, any network device implemented at transport layer i.e. layer-4 or below can be configured to differentially forward the data sequences using the method and system of present disclosure.

Figure 3:
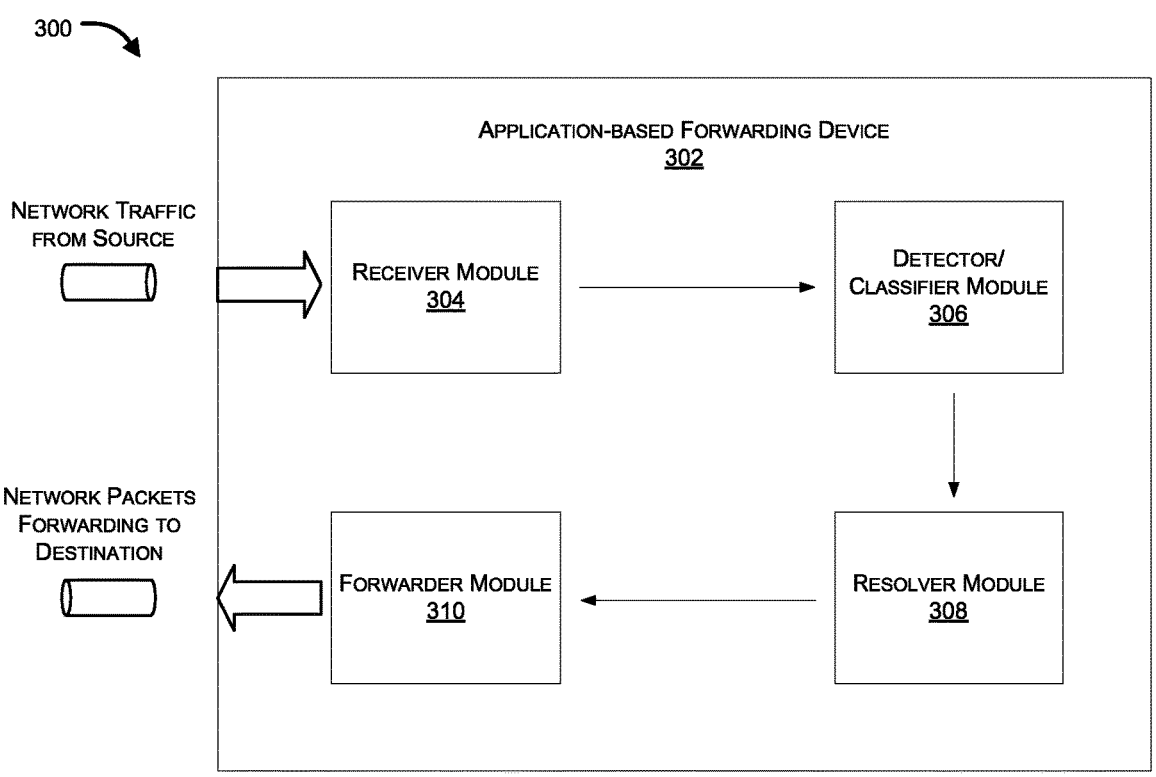
FIG. 3 illustrates exemplary modules of an application based forwarding (ABF) device in accordance with an embodiment of the present invention.

FIG. 3 illustrates exemplary functional modules of an application based packet flow forwarding (ABF) device 302 in accordance with an embodiment of the present invention. As noted above, depending upon the particular implementation, one or more of the functional modules described below may be implemented within a variety of network devices, including, but not limited to, routers, switches, gateway devices, hubs and/or programmable layer 2 switches.

In the context of the present example, application based forwarding device 302 receives an IP packet as network traffic from a source device or from an intermediate network device, processes the packet based on an application with which the packet pertains, and can differentially forward the packet (and subsequent IP packets of the flow) to a destination application or destination device hosting the application. In this example, application based forwarding device 302 includes a receiver module 304 configured to receive an initial packet from an IP traffic flow, a detector/classifier module 306 configured to determine an application with which the initial IP packet may be associated, a resolver module 308 configured to identify a packet forwarding rule(s) to be applied on the initial IP packet based on determined application, and a forwarder module 310 configured to differentially forward the initial IP packet and subsequent IP packets associated with the IP flow based on the identified forwarding rule to the determined application and/or application hosting device.

In an example implementation, receiver module 304 can be configured to receive initial data packets from an IP traffic flow and perform pre-processing. For packets received from another ABF device, pre-processing may include encapsulation/encryption as well as any ingress NAT. Receiver module 304 may receive IP packets from an end point device or from another application based forwarding (ABF) device/intermediate network device, which may have pre-processed the IP packets. In an example implementation, application based forwarding device 302 can also be configured to pre-process the IP packets before passing control to classifier module 406. In an example implementation, AFB device 302 can support different forms of packet encapsulation and/or encryption including but not limiting to VLAN, GRE, IPSec, TLS, VxLAN, LISP, GTP-U and MPLS. In an example implementation, ingress NAT function can be performed by static mapping (eg. VIPs), or through dynamic egress mapping. In an example implementation, one or more ingress reflectors or egress reflectors can be configured to work with application based forwarding device 302.

In one embodiment, detector/classifier module 306 can be configured to determine the application with which the initial IP packet may be associated based on IP header data containing L2/L4 information, an ingress interface identifier, deep packet inspection (DPI) beyond the IP header, and/or based on observation of a DNS request (including a FQDN value for the application server) prior to session establishment. In an example implementation, detector/classifier module 306 can be configured to determine the application with which the packet may be associated even if the initial packet is encrypted, encapsulated or is part of a secured session. In an embodiment of the present disclosure, the detector/classifier module 306 can be configured to determine the application based on IP header information of the initial IP packet.

According to another embodiment of the present disclosure, the detector/classifier module 306 can be configured to determine the application based on ingress interface identifier associated with the initial IP packet of an IP flow. Use of an ingress interface by the detector/classifier module 306 as an application identifier can be based on an assumption that the upstream device directed the packet at issue to the particular ingress interface based on its own application based rules.

According to yet another embodiment of the present disclosure, the detector/classifier module 306 can be configured to determine the application by performing deep packet inspection (DPI) on the initial IP packet. In an example implementation, the detector/classifier module 306 uses DPI for determining the application using a heuristic match or a signature match based on the inspection of packet payloads and/or headers beyond the IP header. DPI may be required in several cases, especially for TCP/SCTP packets where sessions are established prior to DPI detection of the application. In an exemplary implementation, in order to maintain integrity of a pre-established session, L2-based differential forwarding to a device that is acting as an L2 reflector is possible, which can further forward the initial packet to another ABF device.

In another embodiment, the detector/classifier module 306 can be configured to determine the application by predicting the application based on a fully qualified domain name (FQDN) value contained within a Domain Name system (DNS) request issued prior to commencement of the IP flow and before the session is created. In example implementation, a particular FQDN value can be mapped to information identifying the application by means of a database that is operatively coupled with detector/classifier module 306. In an example implementation, a database maintaining the mapping of applications with associated FQDN values can be queried by the detector/classifier module 306 to determine the application prior to session establishment, thus allowing flexibility in the traffic forwarding process.

In an example implementation, application based forwarding device 302 can be configured to correlate FQDNs of the application server with an application, and store such correlated data in a database at the application based forwarding device 302. Since the majority of applications reference the FQDNs of application servers rather than a fixed IP address, it is possible for application based forwarding device 302 to correlate FQDNs with different applications. When a client device initiates a DNS name resolution process, it sends a FQDN value of the application server, for example, and receives in response an IP address of the application server. In one embodiment, application based forwarding device 302 can observe DNS requests/responses and can predict that an immediate future session involving the client device will use the associated application. In an example implementation, application based forwarding device 302 can be configured to predict the immediate-future session to be created by client device based on the observed DNS request/response from an application and can differentially forward the data sequence without compromising the integrity of the session.

In an embodiment, application based forwarding device 302 can be configured to use traditional application detection and provide a programmable L2 shunt of the traffic to a device operating in transparent mode, without violating session integrity.

In an example implementation, the detector/classifier module 306 can be configured to define an egress interface without making any change in the packet. Forwarder module 310 can transform the packet based on the type of egress interface as defined by detector/classifier module 306. Those skilled in the art will appreciate that a network device implementing the features of an application based forwarding device 302 described herein can differentially forward an initial packet and subsequent packets of an IP flow without hampering the integrity of data session.

In an embodiment, resolver module 308 can be operatively coupled with a policy-based engine that enables mapping of an identified application with a corresponding forwarding rule (e.g., an L2 forwarding policy), wherein the forwarding rule is used by the forwarder module 310 to differentially forward the initial IP packet and the subsequent IP packets associated with the IP flow. Resolver module 308 can be a policy-based engine that provides the forwarding rules that govern how a classified IP packet/session/flow can be forwarded. In an example implementation, resolver module 308 can be configured to receive an IP header after receiver transformation (if required), ingress interface ID, application ID as determined by the detector/classifier module 306, and destination device physical ID from the detector/classifier module 306 or any other external source, based on which the resolver module 308 can determine how a packet/flow/session can be forwarded to the destination application/application hosting device. In an example implementation, resolver module 308 can provide router optimization for fast delivery of packets/data flow to the destination application/application device. In example implementations, one or more rules and policies can be defined through a policy manager through which the forwarding rules can be implemented, wherein the policy manager can be operatively coupled with the resolver module 308 of the ABF device 302. Certain policy rules can include rules such as an L2 forwarding action, wherein the L2 forwarding action does not change the packet itself and merely defines the egress interface.

In an embodiment, forwarder module 310 can be configured to forward the initial IP packet and subsequent IP packets of an IP flow based on an egress interface associated with the identified forwarding rule (e.g., an L2 forwarding policy). In an example implementation, forwarder module 310 can be configured to forward the initial IP packet and subsequent IP packets of IP flow to the appropriate application or device hosting the application based on encapsulation information in the initial IP packet. In example implementations, IP data packets can be forwarded to their next hop in different ways. In an example implementation, data packets can be forwarded to their next hop in the network via an egress interface directly. In another example implementation, data packets can be forwarded to their next hop in the network using an L2 shunt that forwards the data packet to an L2 reflector device. In an example implementation, encapsulation such as IPsec, GRE, VxLAN and LISP can be used for forwarding the data packets to a non-adjacent node/hop in the network. In an embodiment of the present disclosure, the forwarder module 308 can be configured to forward the initial IP packet by means of an L2 shunt that forwards the initial IP packet to an L2 reflector device in a transparent manner.

According to one embodiment, apart from the application associated therewith or responsible therefor, packet flows may also be characterized and identified according to other characteristics, including VLAN tags, PPPoE session, and GTP tunnel identifiers of the network layer or data link layer protocol headers/tags that encapsulate the packets, based on which different forwarding rules treat the IP flows differentially. For instance, forwarding rules can also rate limit, filter, mark, redirect, insert advertisement, lawfully intercept, shape, or take any other action on the packets of an IP flow.

In an example implementation, forwarder module 310 can be configured to forward the processed and classified IP data packet to their next hop through the egress interface either directly, or through border relay functions such as 6rd, DS-Lite, etc. In case of IPv6 deployment, or through carrier grade NAT functions such as NAT44, NAT64/DNS64, NAT66, PCP, etc., which can be used for forwarding the classified IP data packet to their next hop.

Those skilled in the art will appreciate that functionality of resolver module 308 can be combined with forwarder module 310, and can govern the operation of forwarder module 308. The distribution of functionality among the various functional modules described herein is merely exemplary. As such, it is contemplated that more or fewer modules may be present in a particular implementation by combining and/or subdividing the various functions described above.

Figure 4:
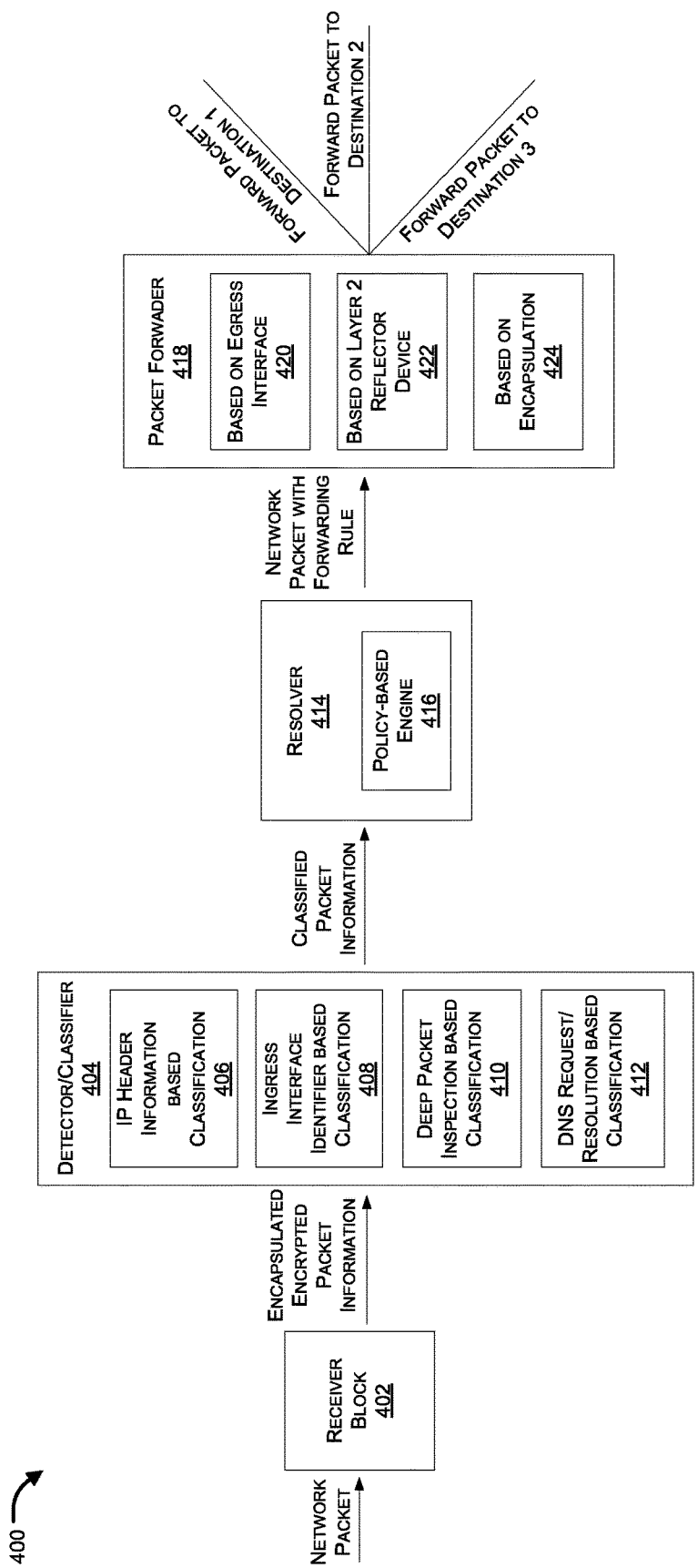
FIG. 4 illustrates an exemplary block diagram showing the sequence of network packet processing for forwarding thereof in accordance with an embodiment of the present invention.

FIG. 4 illustrates an exemplary block diagram 400 showing the sequence of network packet processing for forwarding thereof in accordance with an embodiment of the present invention. Block diagram 400 represents a logical division of an application-based forwarding device (e.g., application-based forwarding device 108, 108-1, 108-2 or 302) that can receive/capture an IP data packet, and forward it using a defined rule based on the determined application using one or more of the application determination techniques described herein. In the context of the present example, network packet(s) can be received/captured by receiver block 402 of an application-based forwarding device, wherein upon receiving the network packet, receiver block 402 can read information from the initial packet of the IP flow and can preprocess the information before forwarding the packet information to detector/classifier 404.

The detector/classifier 404 can be configured to determine the application with which the initial IP packet may be associated. In different implementations, the detector/classifier 404 can use one or more classification mechanisms, including, but not limited to, IP header information based classification 406, ingress interface identifier based classification 408, deep packet inspection based classification 410, and DNS request/resolution based classification 412, to determine the application with which the initial packet may be associated.

In the current example, detector/classifier 404 includes an IP header information based classification module 406, an ingress interface identifier based classification module 408, a deep packet inspection based classification module 410 and a DNS request/resolution based classification module 412. Depending upon the particular implementation, detector/classifier module 404 may make use of an application determination made by one or more of modules 406, 408, 410 and 412. In some embodiments, results of modules 406, 408, 410 and 412 may be input into a voting or prioritization process (not shown) to select or otherwise combine the results. For example, the results generated by modules 406, 408, 410 and 412 may be assigned a weight based on their relative reliability for making an accurate application determination under various circumstances.

In some scenarios, it may be possible for an IP header information based classification performed by module 406 to determine the application which may have generated the packet based on the header details of the initial packet(s) which may contain the application details along with source/destination addresses of the source device and destination device. In other scenarios, an ingress interface identifier based classification performed by module 408 can be configured to determine the application with which the packet may be associated based on an ingress interface identifier associated with the initial IP packet of an IP flow. A deep packet inspection (DIP) based classification performed by module 410 may be more appropriate for certain scenarios and can be configured to determine the application by performing deep packet inspection (DPI) on the initial IP packet, say using a heuristic match or a signature match based on the inspection of packet data beyond the IP header. Alternatively or additionally a DNS request/resolution based classification performed by module 412 can be configured to determine the application by predicting the application based on a fully qualified domain name (FQDN) value contained within a Domain Name System (DNS) request issued prior to and close in time with the initial IP packet formation before the session is created.

Depending on the type of data packet information received from the receiver block 402, the detector/classifier 404 can use a suitable classification mechanism to determine the application. Once the application is determined by the detector/classifier 404, packet information along with the application details, such as application name and/or application ID can be sent to a resolver 414. In an example implementation, resolver 414 can include or be operatively coupled with a policy-based engine 416 that enables mapping of the determined application with an L2 forwarding rule, wherein the forwarding rule can be used by a packet forwarder 418 to differentially forward the initial IP packet (or one or more data frames associated therewith) and the subsequent IP packets associated with the IP flow to the destination application or application hosting device. In an aspect, policy based engine 416 can be configured to provide the forwarding rules that indicate how a classified IP packet/session/flow can be forwarded. In an example implementation, resolver 414 can be configured to receive IP header information after receiver transformation (if required), ingress interface ID, application ID as determined by the detector/classifier 404, and destination device physical ID from the detector/classifier 404 or any other external source, based on which, resolver 414 can determine how a packet/flow/session can be forwarded to the destination application/application hosting device using one or more rule sets. In an example implementation, resolver 414 can provide route optimization for fast delivery of packets/data/session flow to the destination application/application device. In example implementations, one or more rules and policies can be defined through a policy manager and can be used by the policy based engine 416 to resolve the routing path and determine the next hop on the network.

After resolving the routing details and determining the optimal path to be followed by the packet/data/session, resolver 414 can forward those details along with packet information to packet forwarder 418, which may forward the packet to the appropriate host or to another intermediate network device. In an example implementation, packet forwarder 418 can be configured to forward the initial IP packet and subsequent IP packets of IP flow based on egress interface 420 associated with the identified forwarding rule. In an example implementation, packet forwarder 418 can be configured to forward the initial IP packet and subsequent IP packets of IP flow to the appropriate application or device hosting the application based on encapsulation information 424 in the initial IP packet. In an example implementation, the packet forwarder 418 can be configured to forward the initial packets and subsequent packets to the appropriate application based on the layer 2 reflector device 422 decision.

Figure 5:
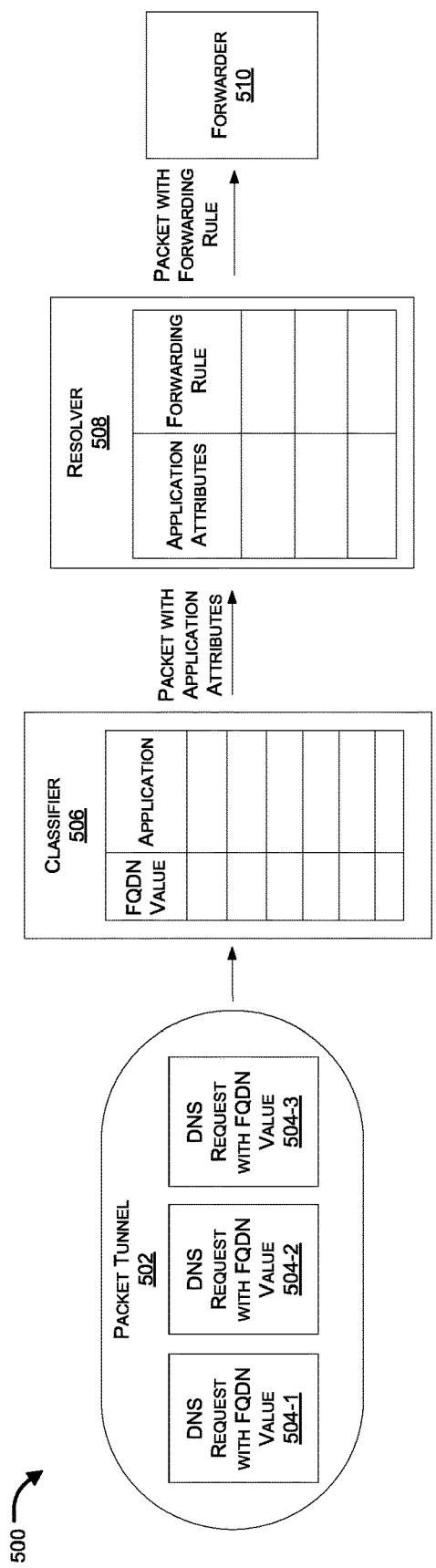
FIG. 5 illustrates an exemplary block diagram showing the sequence of network packet processing for forwarding thereof based on fully qualified domain name (FQDN) values in accordance with an embodiment of the present invention.

FIG. 5 illustrates an exemplary block diagram showing the sequence of network packet processing for forwarding thereof based on fully qualified domain name (FQDN) values in accordance with an embodiment of the present disclosure. As shown on FIG. 5, a packet tunnel 502 at the application based forwarding device may receive/observer one or more DNS request packets that may include FQDN values that can be used for determining the application with which a particular packet may be associated. Packet tunnel 502 may receive DNS requests 504, wherein each request 504 may include a corresponding FQDN value, which can be processed at a classifier 506 to determine the application that corresponds to the FQDN value. Once the application is determined, the same can be mapped against a forwarding rule at a resolver 508 to determine an applicable forwarding rule that should be used for the determined application, using which forwarding rule, a forwarder 510 can then forward that initial and subsequence packets of the IP flow.

Figure 6:
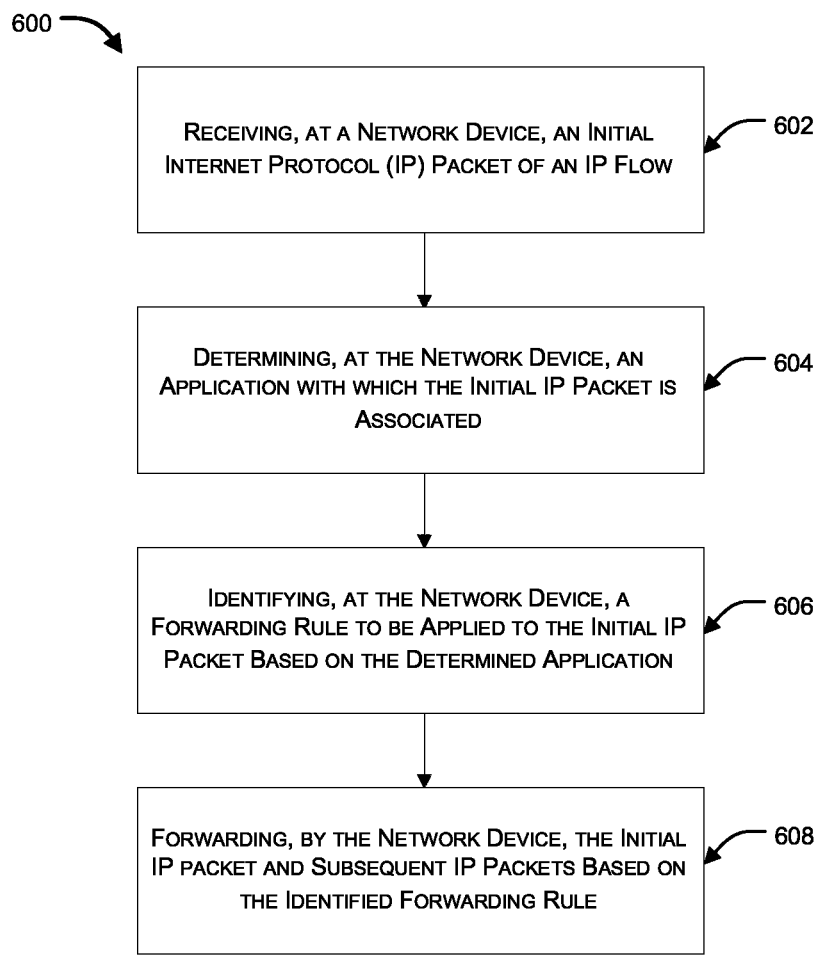
FIG. 6 illustrates an exemplary flow diagram for processing network packets for differential forwarding in accordance with an embodiment of the present invention.

FIG. 6 illustrates an exemplary flow diagram for processing network packets for differential forwarding in accordance with an embodiment of the present disclosure. As shown in the flow diagram 600, method of the present disclosure can include the steps of, at step 602, receiving, at a network device, an initial Internet Protocol (IP) packet of an IP flow. At step 604, determining, at the network device, an application with which the initial IP packet is associated.

At step 606, identifying, at the network device, an L2 forwarding rule to be applied to a data frame of the initial IP packet based on the determined application, and at 608, forwarding, by the network device, the data frames of the initial IP packet and subsequent IP packets based on the identified forwarding rule.

Figure 7:
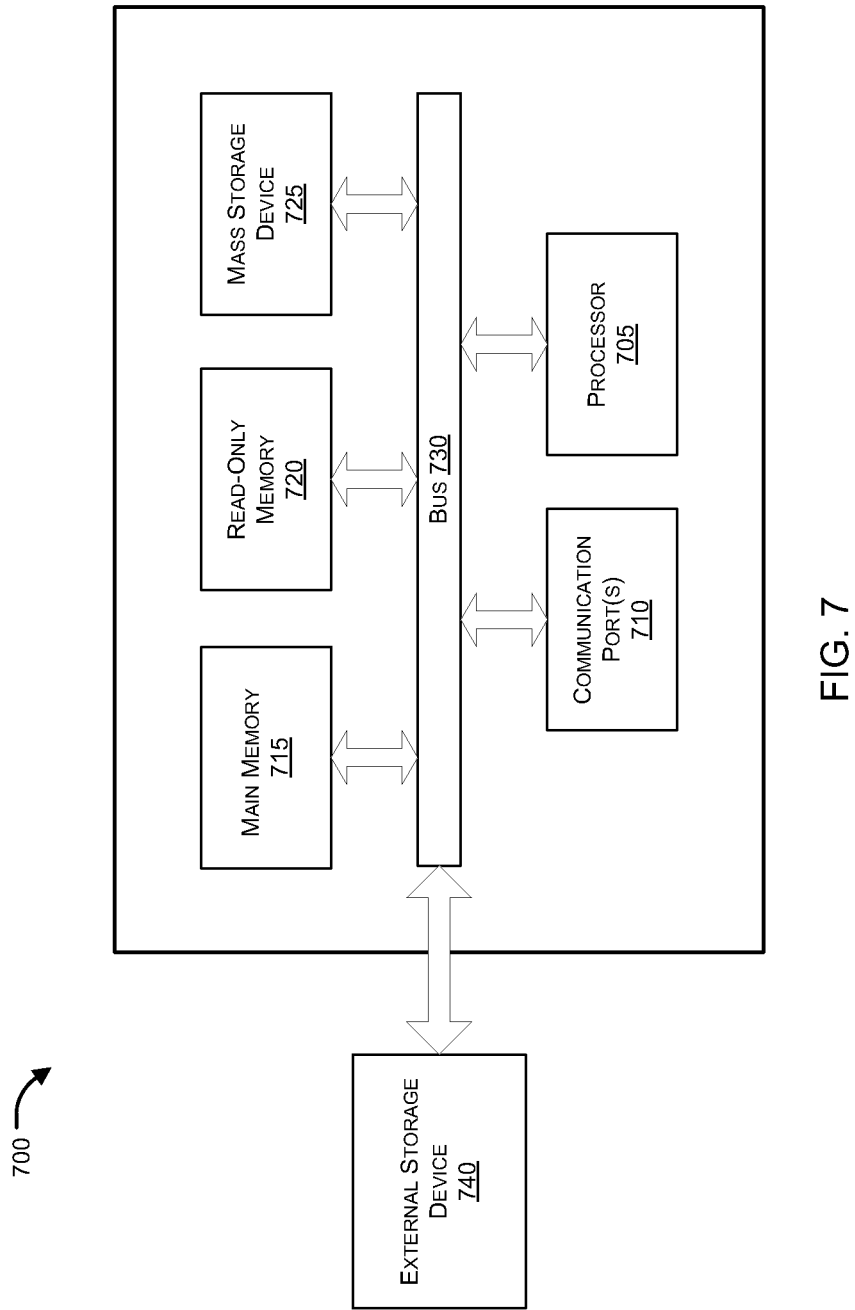
FIG. 7 is an exemplary computer system in which or with which embodiments of the present invention may be utilized.

FIG. 7 is an example of a computer system 700 with which embodiments of the present disclosure may be utilized. Computer system 700 may represent or form a part of a network device (e.g., application-based forwarding device 108, 108-1, 108-2 or 302) implementing various subsets or combinations of functionality described with reference to FIG. 3 or FIG. 4, a server or a client workstation.

Embodiments of the present disclosure include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 700 includes a bus 730, a processor 705, communication port 710, a main memory 715, a removable storage media 740, a read only memory 720 and a mass storage 725. A person skilled in the art will appreciate that computer system 700 may include more than one processor and communication ports.

Examples of processor 705 include, but are not limited to, an Intel® Xeon® or Itanium® processor(s), or AMD® Opteron® or Athlon MP® processor(s), Motorola® lines of processors, FortiSOC™ system on a chip processors or other future processors. Processor 705 may include various modules associated with messaging security gateway 200 as described with reference to FIG. 2. For example, processor 705 may include one or more of mail reception module 202, domain name validation module 204, validity update module 206 and send/discard module 208.

Communication port 710 can be any of an RS-232 port for use with a modem based dialup connection, a 10/100 Ethernet port, a Gigabit or 10 Gigabit port using copper or fiber, a serial port, a parallel port, or other existing or future ports. Communication port 710 may be chosen depending on a network, such a Local Area Network (LAN), Wide Area Network (WAN), or any network to which computer system 700 connects.

Memory 715 can be Random Access Memory (RAM), or any other dynamic storage device commonly known in the art. Read only memory 720 can be any static storage device(s) such as, but not limited to, a Programmable Read Only Memory (PROM) chips for storing static information such as start-up or BIOS instructions for processor 705.

Mass storage 725 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 730 communicatively couples processor(s) 705 with the other memory, storage and communication blocks. Bus 730 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 705 to system memory.

Optionally, operator and administrative interfaces, such as a display, keyboard, and a cursor control device, may also be coupled to bus 730 to support direct operator interaction with computer system 700. Other operator and administrative interfaces can be provided through network connections connected through communication port 710.

Removable storage media 740 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, to avoid obscuring the present invention.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "computing", "comparing", "determining", "adjusting", "applying", "creating", "ranking," "classifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain embodiments of the present invention also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should therefore be determined with reference to the appended claims, along with the full scope of equivalents to which such claims are entitled.

What is claimed is:

1. A network device comprising:
a non-transitory storage device having embodied therein instructions representing one or more modules operable to differentially forward packets based on an application with which the packets are associated; and
one or more processors coupled to the non-transitory storage device and operable to execute the one or more modules, wherein the one or more modules include:
a receiver module, which when executed by the one or more processors, receives an initial layer 3 (L3) Internet Protocol (IP) packet of an IP flow;
a classifier module, which when executed by the one or more processors, determines an application with which the initial L3 IP packet is associated by predicting the application based on a fully qualified domain name (FQDN) value contained within a Domain Name System (DNS) request observed by the network device prior to the initial L3 IP packet, wherein the FQDN value is mapped to information identifying the application by means of a database operatively coupled with the classifier module;
a resolver module, which when executed by the one or more processors, identifies a layer 2 (L2) forwarding rule to be applied to a data frame of the initial L3 IP packet based on the determined application; and
a forwarder module, which when executed by the one or more processors, forwards data frames of the initial L3 IP packet and subsequent L3 IP packets associated with the IP flow based on the identified L2 forwarding rule.

2. The network device of claim 1, wherein the receiver module is further configured to pre-process the initial L3 IP packet before application determination processing is performed on the initial L3 IP packet by the classifier module.

3. The network device of claim 2, wherein said pre-processing comprises one or a combination of encapsulation, encryption and network address translation.

4. The network device of claim 1, wherein said network device is selected from one or a combination of a router, a gateway device, a switch, a hub and a programmable L2 switch.

5. The network device of claim 1, wherein said classifier module is configured to determine the application based at least in part on IP header information of the initial L3 IP packet.

6. The network device of claim 1, wherein said classifier module is configured to determine the application based at least in part on an ingress interface identifier information associated with the initial L3 IP packet.

7. The network device of claim 1, wherein said classifier module is configured to determine the application at least in part by performing deep packet inspection on the initial L3 IP packet.

8. The network device of claim 1, wherein said resolver module is operatively coupled with a policy-based engine that enables mapping of the determined application with the L2 forwarding rule, and wherein the forwarding rule is used by said forwarder module to differentially forward the initial L3 IP packet and the subsequent L3 IP packets associated with the IP flow.

9. The network device of claim 1, wherein said forwarder module forwards the initial L3 IP packet based on an egress interface associated with the identified L2 forwarding rule.

10. The network device of claim 1, wherein said forwarder module forwards the initial L3 IP packet based on encapsulation information in the initial L3 IP packet.

11. The network device of claim 1, wherein said forwarder module forwards the initial L3 IP packet by means of an L2 shunt that forwards the initial L3 IP packet to an L2 reflector device.

12. The network device of claim 1, wherein said classifier module is configured to determine the application by applying a voting or prioritization process to results of a plurality of classification mechanisms, including:
   said predicting the application based on a fully qualified domain name (FQDN) value contained within a Domain Name System (DNS) request issued prior to the initial L3 IP packet;
   a second classification mechanism based on IP header information of the initial L3 IP packet;
   a third classification mechanism based on an ingress interface identifier information associated with the initial L3 IP packet; and
   a fourth classification mechanism involving performing deep packet inspection on the initial L3 IP packet.

13. A method for forwarding a network packet comprising:
   receiving, by a network device, an initial layer 3 (L3) Internet Protocol (IP) packet of an IP flow;
   determining, by the network device, an application with which the initial L3 IP packet is associated by predicting the application based on a fully qualified domain name (FQDN) value contained within a Domain Name System (DNS) request observed by the network device prior to the initial L3 IP packet, wherein the FQDN value is mapped to information identifying the application by means of a database operatively coupled with the network device;
   identifying, by the network device, a layer 2 (L2) forwarding rule to be applied to an L2 data frame of the initial L3 IP packet based on said determined application; and
   forwarding, by the network device, L2 data frames of the initial L3 IP packet and subsequent L3 IP packets associated with the IP flow based on the identified L2 forwarding rule.

14. The method of claim 13, further comprising pre-processing the initial L3 IP packet prior to said determining.

15. The method of claim 14, wherein said pre-processing comprises one or a combination of encapsulation, encryption and network address translation.

16. The method of claim 13, wherein said network device is selected from one or a combination of a router, a gateway device, a switch, a hub, and a programmable L2 switch.

17. The method of claim 13, wherein said determining is based at least in part on IP header information of the initial L3 IP packet.

18. The method of claim 13, wherein said determining is based at least in part on ingress interface identifier information associated with the initial L3 IP packet.

19. The method of claim 13, wherein said determining further comprises performing deep packet inspection on the initial L3 IP packet.

20. The method of claim 13, wherein said identifying comprises mapping the determined application to the L2 forwarding rule, and wherein the L2 forwarding rule is used by the network device to differentially forward the initial L3 IP packet and the subsequent L3 IP packets associated with the IP flow.

21. The method of claim 13, wherein said forwarding comprises forwarding the initial L3 IP packet based on an egress interface associated with the identified L2 forwarding rule.

22. The method of claim 13, wherein said forwarding comprises forwarding the initial L3 IP packet based on encapsulation information in the initial L3 IP packet.

23. The method of claim 13, wherein said forwarding comprises forwarding the initial L3 IP packet by means of an L2 shunt that forwards the initial L3 IP packet to a L2 reflector device.

24. The method of claim 13, wherein said determining involves applying a voting or prioritization process to results of a plurality of classification mechanisms, including:
   said predicting the application based on a fully qualified domain name (FQDN) value contained within a Domain Name System (DNS) request issued prior to the initial IP packet;
   a second classification mechanism based on IP header information of the initial L3 IP packet;
   a third classification mechanism based on an ingress interface identifier information associated with the initial L3 IP packet; and
   a fourth classification mechanism involving performing deep packet inspection on the initial L3 IP packet.

* * * * *